United States Patent [19]

Greig et al.

[11] Patent Number: 4,954,299

[45] Date of Patent: Sep. 4, 1990

[54] STRUCTURES OF PLASTICS MATERIAL

[76] Inventors: John M. Greig, 24 Chevington Grove, Whitley Bay, Tyne & Wear NE25 9UG, England; Jeremy A. Bowman, 62 Leas Drive, Iver, Buckinghamshire, SLO 9RD, England

[21] Appl. No.: 373,641

[22] Filed: Jun. 28, 1989

Related U.S. Application Data

[63] Continuation of Ser. No. 84,207, Aug. 12, 1987, abandoned.

[30] Foreign Application Priority Data

Aug. 18, 1986 [GB] United Kingdom ............... 8620071

[51] Int. Cl.$^5$ ..................... B29C 71/02; B29C 71/04; B29C 65/02
[52] U.S. Cl. .................................. 264/22; 156/273.5; 156/275.5; 156/304.6; 264/236; 264/248; 264/250; 264/265; 264/310; 264/347; 425/506; 425/507
[58] Field of Search ................... 264/22, 25, 248, 265, 264/250, 249, 310, 311, 236, 347, DIG. 42, DIG. 76, 263; 156/273.3, 273.5, 275.5, 304.2, 304.6; 425/506, 507, 392

[56] References Cited

U.S. PATENT DOCUMENTS

| 3,576,933 | 4/1971 | Bates | 264/347 |
|---|---|---|---|
| 3,809,737 | 5/1974 | Rogers et al. | 264/155 |
| 3,989,787 | 11/1976 | Scott, Jr. et al. | 264/310 |
| 4,056,421 | 11/1977 | Jarvis | 156/273.5 |
| 4,318,763 | 3/1982 | Bieler et al. | 264/22 X |
| 4,555,379 | 11/1985 | Marihger et al. | 264/310 |
| 4,863,536 | 9/1989 | Heidenhaih et al. | 264/22 |
| 4,877,562 | 10/1989 | Wilson et al. | 264/311 |

FOREIGN PATENT DOCUMENTS

| 139544 | 1/1980 | Fed. Rep. of Germany ... 156/304.2 |
|---|---|---|
| 56-95635 | 8/1981 | Japan ................................... 264/250 |
| 334763 | 3/1959 | Switzerland ........................ 264/248 |

Primary Examiner—Jan H. Silbaugh
Assistant Examiner—Mathieu Vargot
Attorney, Agent, or Firm—Larson and Taylor

[57] ABSTRACT

Large fittings or other structures are made by rotationally moulding a first component 18 of polyethylene and joining cylindrical pups 20, 22, 24 of polyethylene to the component by butt fusion joints 26, 28, 30. The structure within the boundary 50 is irradiated with gamma radiation followed by post-heating to remove free radicals. The extremities of the pups are shielded to prevent irradiation. Their capability to be joined to polyethylene pipes 12, 14, 16 by butt-fusion joints 32, 34, 36 is unimpaired. The irradiation introduces cross-linking to give improved properties such as impact resistance and stress crack resistance and to bring the fitting within the specification for polyethylene pipe for natural gas distribution. The joints 26, 28, 30 are made using differential heating of the ends to be joined to compensate for differences in melt flow index. Alternatively, the component 18 is slightly irradiated to lower its MFI before the pups are joined to it.

5 Claims, 1 Drawing Sheet

STRUCTURES OF PLASTICS MATERIAL

This application is a continuation of application Ser. No. 07/084,207 filed 08/12/87, now abandoned.

The invention relates to structures of plastics material and methods of making them.

The invention particularly, though not exclusively, relates to structures such as T-fittings for example of relatively large diameter for use in natural gas distribution pipelines and systems At present such fittings are of steel or other material but are of relatively complicated construction because to date no economically viable method of making them from plastics material has been evolved.

The object of the invention is to provide an economically viable method of making structures of plastics material including inter alia fittings for use in natural gas distribution.

A method of making a structure of plastics material, according to the invention, comprises irradiating a first part of the structure to introduce or increase cross-linking in said first part to improve a property or properties thereof while keeping a second part or second parts of the structure free of irradiation so that the capability of said second part or parts to be joined by fusion to plastics material remains unimpaired.

Preferably, a first component of the structure is made by rotational moulding and at least one second component is joined to the first component. The first part of the structure comprises the whole of the first component, an adjacent portion of the or each second component and the respective joint therebetween.

Typically, for example, the structure is a fitting intended to be joined to plastics material in the form of pipe.

Examples of the method and embodiments of structures so made will now be described by way of example with reference to the accompanying drawings in which:

DESCRIPTION OF THE PREFERRED EMBODIMENTS

Figure 1:
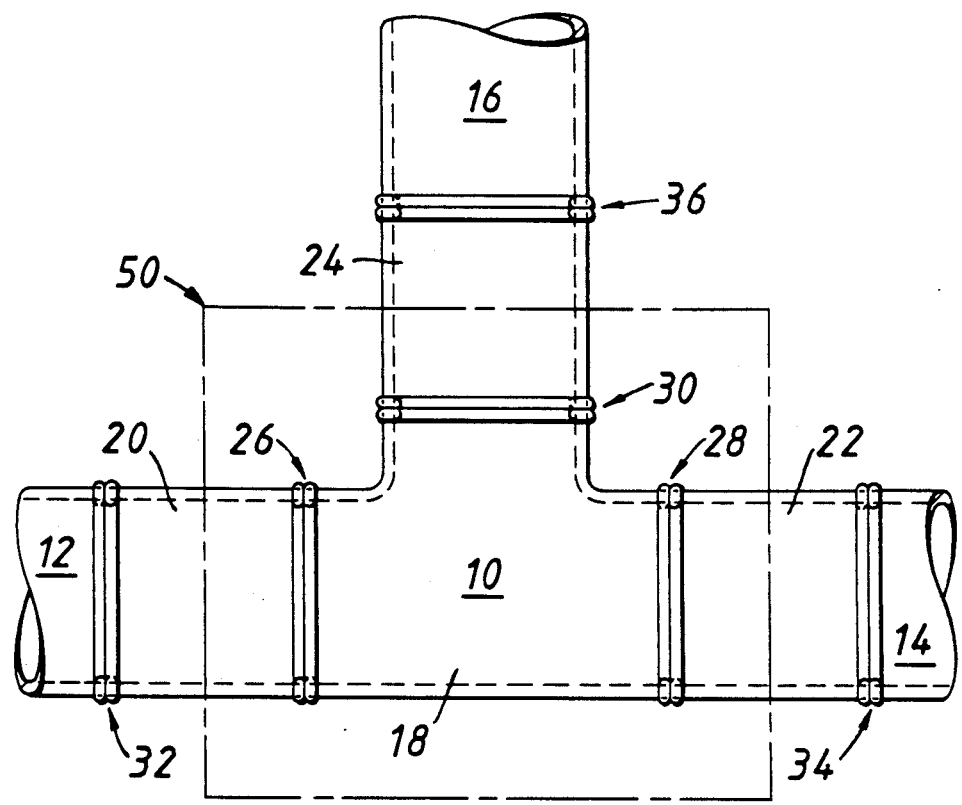
FIG. 1 is a diagrammatic side-elevation of one such embodiment in the form of a T-fitting shown in use forming part of a pipe system.

The drawings show part of a distribution pipe system for natural gas in which a T-fitting 10 having three limbs is joined to pipe lengths 12, 14, 16. The fitting 10 and the pipes 12, 14, 16 are made of for example, extrusion grade polyethylene. The fitting 10 comprises four components namely: a hollow T-shaped component 18, which is made by rotational moulding polyethylene of rotational moulding grade, and three hollow cylindrical pups 20, 22, 24 each being a short length of extrusion grade polyethylene which is suitable for joining to the material of the pipes 12, 14, 16 by fusion. The pups and the pipes both have outside diameters of typically 500 millimetres and wall thickness of 30 mm. Each pup is some 500 mm long and the length of the component 18 is some 1000 mm between the pups 20, 22. The overall vertical dimension of the component 18 is seen in the positive shown in FIG. 1 is some 725 mm. The fitting 10 is therefore relatively large.

Figure 2:
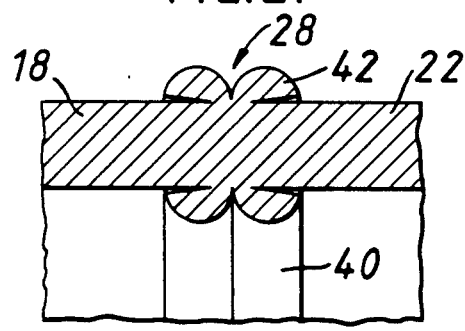
FIG. 2 is an enlarged scrap sectional view through one of the joints in the fitting in FIG. 1.

The pups 20, 22, 24 are joined to the component 18 by respective butt fusion joints at 26, 28, 30 and the pipes 12, 14, 16 are similarly joined to the pups at respective joints 32, 34, 36. At each joint upset material is displaced during the jointing process to form internal and external beads. FIG. 2 shows the joint at 28 on an enlarged scale, the internal and external beads 40, 42 being shown.

In one form of the method the fusion joints between the component 18 and the pups 20, 22, 24 are made in the factory using apparatus in which there are two plates heated to different temperatures against which the component and pup are forced to heat their ends. The temperature difference is for example 20°–50° C and is chosen to compensate as far as possible for the different melt flow indices (MFI's) of the two materials, that of the component 18 being relatively higher. Once the ends are heated sufficiently the plates are removed and the ends are forced together. The MFI is expressed as grammes/10 minutes at 190° Centigrade under a load of 2.16 kilogrammes. The MFI is a measure of the viscosity of the molten materials.

The pipes are jointed to the pups in the field using a similar method but only a single plate is necessary as the materials of the pipes and pups are identical. Typically the MFI of the rotational moulding grade polyethylene of the component 18 is between 1.5 and 10 but may be as high as 20 for example. By contrast the MFI of the extrusion grade polyethylene of the pups and pipes is 0.2 or less but may be as high as 1.0 say.

This implies a major discrepancy in the viscosities of the molten materials at the ends against the heating plate, which has made it impracticable to butt joint the ends under field conditions.

The wall thickness of the component 18 may be equal throughout to that of the pups but alternatively the end portions of the limbs of the component 18 may be of reduced thickness equal to the wall thickness of the pups while the remainder of the component 18 has a greater wall thickness.

After the pups have been joined to the component 18 in the factory, the resulting multi-component structure is partly exposed to gamma radiation. The outermost halves of the pup components 20, 22, 24 are not exposed to the radiation. The remainder of the structure, that is the parts within the boundary 50 shown in FIG. 1, is irradiated. The irradiation is performed in a water bath or with a blanket of nitrogen covering the structure to prevent oxidation. Forced nitrogen flow may be used during irradiation and during a period of heating after irradiation if such heating is used. It is preferred to use post-heating temperatures in the range of 80°–90° to remove free radicals resulting from the irradiation stage. During cooling of the structure the nitrogen blanket persists but forced flow is no longer necessary.

The dose of radiation given to the structure is selected to be sufficient to convert, for example, between 10% and 80% of the polyethylene to insoluble gel structure in which cross-linking is present. This enhances the resistance to slow crack growth and therefor the overall performance characteristics of the fitting can thus be brought for example within British Gas plc's 1986 specification, for polyethylene pipes and fittings. The dose, for example, may be 200–300 kilo Grays. Materials of the so-called pro-rad kind can be incorporated in the rotational moulding grade polyethylene to alter the effect of the radiation. Anti-rad material can be incorporated in the pups in addition or as an alternative to the use of the pro-rad material. Other properties than those mentioned can, of course, be introduced or enhanced by irradiation depending on the application for which the structure is intended.

It is preferred to check the structure as follows: after fusion and before irradiation, the external bead 42 (FIG. 2) at each joint 26, 28, 30 is machined off and examinations are carried out to determine whether any slits are present in the joints. After irradiation, the internal bead 40 (FIG. 2) is machined off and each of the joints 26, 28, 30 is tested for the proportion of gel formed. As an alternative, indicators can be used which give an indication of the irradiation dose.

The joining of unirradiated end portions of the pups by butt fusion to polyethylene pipes is unimpaired. This can be checked by machining off samples from the ends of the pups and conducting an MFI test.

In a modification of the method, the component 18 is exposed to a minor dose of radiation before the pups 12, 14, 16 are jointed to the component 18. Such a radiation dose is typically for example 10–30 kGy, approximately one tenth of the total dose. It does not improve the stress crack resistance but it lowers the MFI of the component 18 to a value the same as or close to that of the pups. When the pups are joined to the component 18 only a single heater plate needs to be used, engaged at opposite sides by the pup and the limb of the component 18.

After the pups are joined, the structure is irradiated but the dose is adjusted to take account of the preliminary dose already given to the component 18.

In other modifications (not shown) instead of using butt joints it is possible to use socketed joints or electro-fusion joints which are irradiated in a manner similar to that already described.

The invention is not limited to the manufacture of T-fittings nor is it limited to structures for use in gas pipe systems. For example, structures for use in water supply and process installations can be made using the method. In addition to T-fittings, structures which can be made include Reducers, Reducer T-fittings, Short Bends, Valves, Flanged fittings, Pipes and Pressure Vessels.

The method described above enables relatively economical methods such as rotational moulding, for example, to be used to form a structure or part of it, after which the desired property or properties can be introduced or enhanced. However, the joining capability of the material remains unimpaired.

The invention is applicable to polymeric materials other than polyethylene e.g. polyethylene co-polymers and polyvinyl chloride. Also, the components of the structure need not all be made of the same material.

We claim:

1. A method of making a relatively large multi-component pipe fitting of polymeric plastics material which fitting is capable of being joined to a pipe of polymeric plastics material in the field by fusion, said fitting comprising a self-supported hollow body moulded rotationally from rotational moulding grade polymeric plastics material having a relatively high melt flow index of 1.5 or greater and formed with at least one annular body end portion having a relatively large diameter, said fitting further comprising for each said body end portion a corresponding self-supporting hollow pup formed by extrusion from extrusion grade polymeric plastics material having a relatively low melt flow index of 1.0 or less, said pup having at opposite ends thereof first and second annular pup end portions having an outside diameter and a wall thickness the match the annular body end portion to which it is joined, said method comprising the steps of:
   (i) forming an annular joint between each said body end portion and said first pup end portion of said corresponding pup under factory conditions by fusion thus forming a multi-component structure, said fusion step comprising heating the body to a first relatively higher temperature and the pup end to a second relatively lower temperature, said temperatures being chosen to compensate for the difference in melt flow indexes;
   (ii) shielding each said second pup end portion against the effect of gamma radiation, leaving the remainder of said structure unshielded;
   (iii) exposing the whole of said remainder of said structure, including each said joint, to gamma radiation to produce cross-linking within said remainder to thereby enhance the resistance thereof to slow crack growth; said second pup end portion affording capability for said pup to be joined to said pipe in the field by fusion as aforesaid.

2. A method according to claim 1, said fusion step comprising using a socketed joint to join the or each pup to the body.

3. A method of making a relatively large multi-component pipe fitting of polymeric plastics material which fitting is capable of being joined to a pipe of polymeric plastics material in the field by fusion, said fitting comprising a self-supported hollow body moulded rotationally from rotational moulding grade polymeric plastics material having a relatively high melt flow index of 1.5 or greater and formed with at least one annular body end portion having a relatively large diameter, said fitting further comprising for each said body end portion a corresponding self-supporting hollow pup formed by extrusion from extrusion grade polymeric plastics material having a relatively low melt flow index of 1.0 or less, said pup having at opposite ends thereof first and second annular pup end portions having an outside diameter and a wall thickness to match the annular body end portion to which it is joined, said method comprising the steps of:
   (i) subjecting said body before joining said pup or pups thereto to a preliminary exposure to gamma radiation to lower the melt flow index thereof so that said index approaches that of the or each pup;
   (ii) forming an annular joint between each said body end portion and said first pup end portion of said corresponding pup under factory conditions by fusion thus forming a multi-component structure, said fusion step comprising heating the body and the pup to a common temperature;
   (iii) shielding each said second pup end portion against the effect of gamma radiation, leaving the remainder o f said structure unshielded;
   (iv) exposing the whole or said remainder of said structure, including each said joint, to gamma radiation to produce cross-linking within said remainder thereby to enhance the resistance thereof to slow crack growth; said second pup end portion affording capability for said pup to be joined to said pipe in the field by fusion as aforesaid.

4. A method according to claim 3, said fusion step comprising using an electro-fusion fitting to join the or each pup to the body.

5. A method of making a pipe system comprising joining a fitting made by the method according to any of claims 1 to 4 to a pipe in the field, said pipe being of extruded polymeric plastics material and being joined by fusion to said second pup end portion of the pup or of one of the pups of said fitting.

* * * * *